United States Patent
Ito

(10) Patent No.: US 9,272,583 B2
(45) Date of Patent: Mar. 1, 2016

(54) PNEUMATIC TIRE

(71) Applicant: SUMITOMO RUBBER INDUSTRIES, LTD., Kobe-shi, Hyogo (JP)

(72) Inventor: Hiroshi Ito, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 206 days.

(21) Appl. No.: 14/023,129

(22) Filed: Sep. 10, 2013

(65) Prior Publication Data

US 2014/0083591 A1    Mar. 27, 2014

(30) Foreign Application Priority Data

Sep. 24, 2012 (JP) ................................ 2012-209167

(51) Int. Cl.
*B60C 15/05* (2006.01)
*B60C 17/00* (2006.01)
*B60C 17/04* (2006.01)
*B60C 15/04* (2006.01)
*B60C 15/06* (2006.01)

(52) U.S. Cl.
CPC ................. *B60C 15/04* (2013.01); *B60C 15/05* (2013.01); *B60C 15/0603* (2013.04); *B60C 15/0607* (2013.04); *B60C 17/0009* (2013.04); *B60C 2001/0058* (2013.04)

(58) Field of Classification Search
CPC   B60C 15/04; B60C 15/0603; B60C 15/0607; B60C 15/05; B60C 2001/0058; B60C 2015/001; B60C 17/00; B60C 17/0009; B60C 17/0018; B60C 15/00
See application file for complete search history.

(56) References Cited

U.S. PATENT DOCUMENTS

| | | | |
|---|---|---|---|
| 6,179,029 B1* | 1/2001 | Costa Pereira et al. | 152/525 |
| 6,494,242 B2* | 12/2002 | Cottrell | 152/454 |
| 6,814,119 B2* | 11/2004 | Caretta et al. | 152/517 |
| 2002/0179216 A1* | 12/2002 | Pereira et al. | 152/544 |
| 2006/0096690 A1* | 5/2006 | Nakata | 152/560 |
| 2012/0111470 A1* | 5/2012 | Scarpitti et al. | 152/548 |

FOREIGN PATENT DOCUMENTS

| | | | |
|---|---|---|---|
| JP | 2005-112042 | * | 4/2005 |
| JP | 2005-126555 A | | 5/2005 |
| JP | 2012-126299 | * | 7/2012 |

OTHER PUBLICATIONS

English machine translation of JP2005-112042, dated Apr. 2005.*

* cited by examiner

*Primary Examiner* — Justin Fischer
*Assistant Examiner* — Robert Dye
(74) *Attorney, Agent, or Firm* — Birch, Stewart, Kolasch & Birch, LLP

(57) ABSTRACT

A tire 2 includes beads 10, a carcass 12, and an insert 18. The carcass 12 includes a carcass ply 36. An inner part 34a of each bead 10 includes an inner core 46a and an inner apex 48a that extends almost outward of the inner core 46a in the radial direction. An outer part 34b of each bead 10 includes an outer core 46b and an outer apex 48b that extends almost outward of the outer core 46b in the radial direction. A ratio of a complex elastic modulus Ea of the inner apex 48a to a complex elastic modulus Eb of the outer apex 48b is less than or equal to 0.3. A ratio of the complex elastic modulus Ea to a complex elastic modulus Ec of the insert 18 is greater than or equal to 1.

6 Claims, 2 Drawing Sheets

PNEUMATIC TIRE

This application claims priority on Patent Application No. 2012-209167 filed in JAPAN on Sep. 24, 2012. The entire contents of this Japanese Patent Application are hereby incorporated by reference.

BACKGROUND OF THE INVENTION

1. Field of the Invention

The present invention relates to pneumatic tires.

2. Description of the Related Art

In recent years, run flat tires that include inserts (also referred to as load support layers) inward of sidewalls have been developed, and are becoming widespread. Such run flat tires are referred to as side-reinforcing type run flat tires.

In the side-reinforcing type run flat tire, when an internal pressure is reduced due to puncture, the weight of the vehicle is supported by the inserts. This run flat tire enables running over a certain distance also in a punctured state. An Automobile having the run flat tires mounted therein need not have a spare tire on a constant basis. In a case where the run flat tire is used, change of tires in an inconvenient place can be avoided. An example of the side-reinforcing type run flat tire is disclosed in JP2005-126555.

The tire includes beads. Each bead includes a core, and an apex extending outward of the core in the radial direction. The apex is tapered outward in the radial direction, and is formed from a highly hard crosslinked rubber.

The apex is formed from a single rubber composition in general. Components contained in the rubber composition and contents of the components are adjusted to adjust a characteristic of the apex.

For example, a crosslinked rubber having a high elastic modulus may be used for the apex. The tire including the apex is excellent in steering stability. However, the apex is likely to transmit vibration caused due to unevenness of a road surface. The apex may deteriorate ride comfort exhibited by the tire.

The apex is disposed inward of an insert in the radial direction. As in the tire disclosed in JP2005-126555 described above, the insert may be joined to the apex. In this case, in a case where an internal pressure of the tire is reduced due to puncture, stress is concentrated on a boundary face between the insert and the apex. In particular, in a case where an apex having a high elastic modulus is used, the concentration of the stress becomes significant. The significant concentration of the stress affects durability (also referred to as run flat durability) of the tire in the case of an internal pressure of the tire being reduced due to puncture.

An object of the present invention is to make available a pneumatic tire excellent in ride comfort and run flat durability.

SUMMARY OF THE INVENTION

A pneumatic tire according to the present invention includes: a pair of beads; a carcass extending between one of the beads and the other of the beads; and an insert disposed inward of the carcass. The carcass includes a carcass ply. Each of the beads includes an inner part disposed inward of the carcass ply in an axial direction, and an outer part disposed outward of the carcass ply in the axial direction. The inner part includes an inner core that contacts with an inner surface of an end portion of the carcass ply, and an inner apex that covers the inner core and extends almost outward of the inner core in a radial direction. The outer part includes an outer core that contacts with an outer surface of the end portion of the carcass ply, and an outer apex that covers the outer core and extends almost outward of the outer core in the radial direction. The insert is disposed outward of the inner apex in the radial direction. A ratio of a complex elastic modulus Ea of the inner apex to a complex elastic modulus Eb of the outer apex is less than or equal to 0.3. A ratio of the complex elastic modulus Ea of the inner apex to a complex elastic modulus Ec of the insert is greater than or equal to 1.

Preferably, in the pneumatic tire, the complex elastic modulus Ea of the inner apex is higher than or equal to 9 MPa, and not higher than 24 MPa.

Preferably, in the pneumatic tire, when a position at which an inner width of the tire formed by an inner surface of the tire is maximum in the axial direction, is represented as PW, a ratio of a height Hb, in the radial direction, from a bead base line to an outer end of the outer apex with respect to a height Hw, in the radial direction, from the bead base line to the position PW is greater than or equal to 0.6, and not greater than 1.5.

Preferably, in the pneumatic tire, a position of an outer end of the inner apex is the same as a position of an outer end of the outer apex in the radial direction, or the outer end of the inner apex is located inward of the outer end of the outer apex in the radial direction.

In the pneumatic tire of the present invention, ride comfort and run flat durability are improved.

DESCRIPTION OF THE PREFERRED EMBODIMENTS

The following will describe in detail the present invention based on preferred embodiments with reference to the accompanying drawing.

Figure 1:
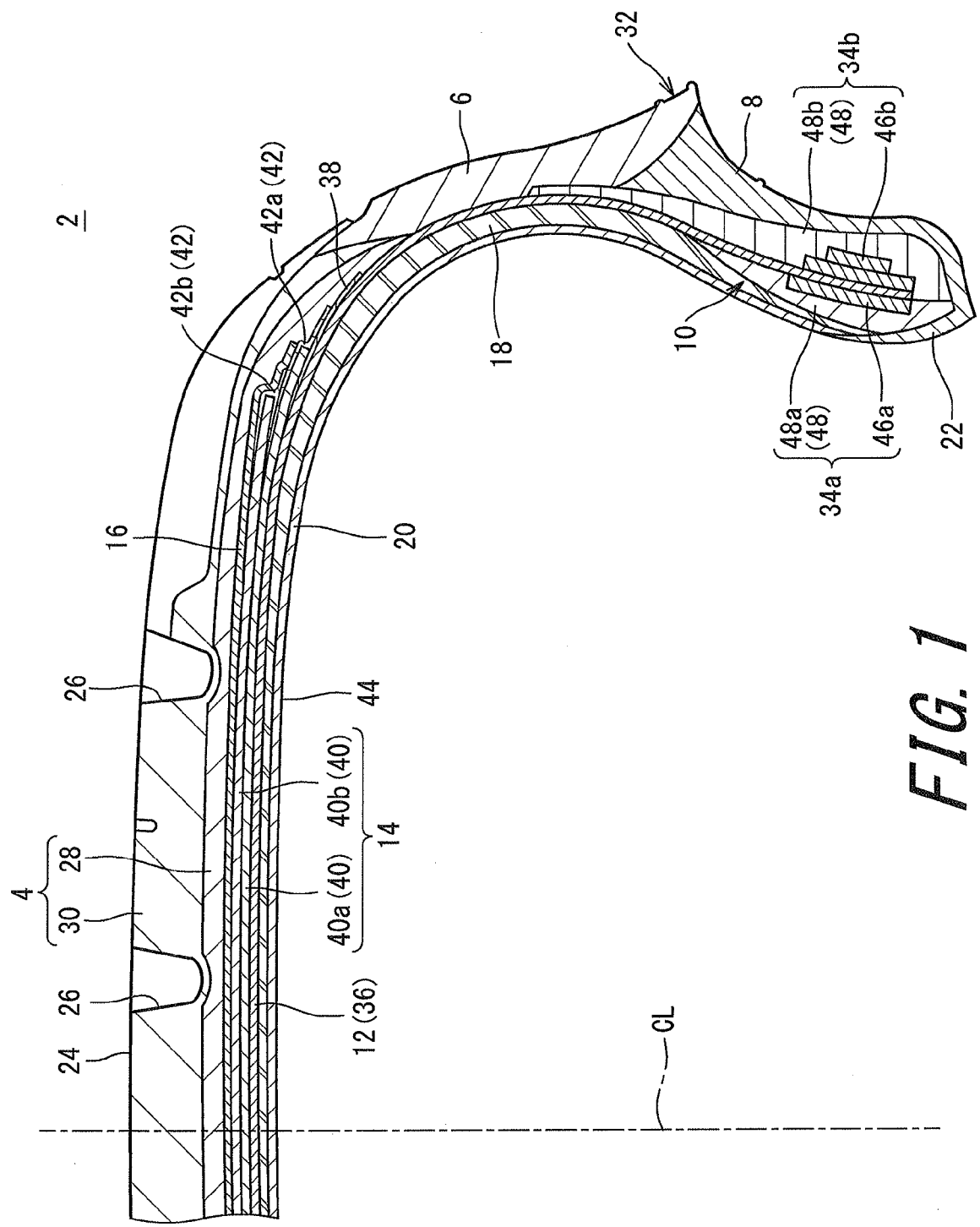
FIG. 1 is a cross-sectional view of a part of a pneumatic tire according to one embodiment of the present invention.

FIG. 1 shows a pneumatic tire 2. In FIG. 1, the upward/downward direction represents the radial direction of the tire 2, the leftward/rightward direction represents the axial direction of the tire 2, and the direction orthogonal to the surface of the sheet represents the circumferential direction of the tire 2. In FIG. 1, an alternate long and short dash line CL represents an equator plane of the tire 2. The shape of the tire 2 except for a tread pattern is symmetric about the equator plane.

The tire 2 includes a tread 4, sidewalls 6, clinches 8, beads 10, a carcass 12, a belt 14, a band 16, an insert 18, an inner liner 20, and chafers 22. The tire 2 is of a tubeless type. The tire 2 is mounted to passenger cars.

The tread 4 has a shape projecting outward in the radial direction. The tread 4 forms a tread surface 24 which can contact with a road surface. The tread surface 24 has grooves 26. The tread pattern is formed by the grooves 26. The tread 4 includes a base layer 28 and a cap layer 30. The cap layer 30 is disposed outward of the base layer 28 in the radial direction. The cap layer 30 is layered over the base layer 28. The base layer 28 is formed from a crosslinked rubber excellent in adhesion. A typical base rubber of the base layer 28 is a natural rubber. The cap layer 30 is formed from a crosslinked rubber that is excellent in wear resistance, heat resistance, and grip performance.

The sidewalls 6 extend from ends, respectively, of the tread 4 almost inward in the radial direction. The sidewalls 6 are joined to the tread 4 at the outer ends, in the radial direction, of the sidewalls 6. The sidewalls 6 are joined to the clinches 8 at the inner ends, in the radial direction, of the sidewalls 6, respectively. The sidewalls 6 are formed from a crosslinked rubber excellent in cut resistance and weather resistance. The sidewalls 6 are disposed outward of the carcass 12 in the axial direction. The sidewalls 6 prevent damage of the carcass 12. In the tire 2, the sidewalls 6 include ribs 32, respectively. The ribs 32 project outward in the axial direction. The ribs 32 prevent damage of a flange of a rim (not shown) to which the tire 2 is mounted.

The clinches 8 are disposed almost inward of the sidewalls 6, respectively, in the radial direction. The clinches 8 are disposed outward of the beads 10 and the carcass 12 in the axial direction. The clinches 8 are formed from a crosslinked rubber excellent in wear resistance. The clinch 8 abuts against the flange of the rim.

The beads 10 are disposed inward of the clinches 8, respectively, in the axial direction. Each bead 10 includes an inner part 34a and an outer part 34b. More specifically, each bead 10 is formed by the inner part 34a and the outer part 34b. The inner part 34a is disposed inward of the carcass 12 in the axial direction. The outer part 34b is disposed outward of the carcass 12 in the axial direction. As is apparent from the drawings, a part of the carcass 12 is sandwiched between the inner part 34a and the outer part 34b.

The carcass 12 includes a carcass ply 36. In the tire 2, the carcass 12 is formed by one carcass ply 36. The carcass 12 may be formed by two or more carcass plies 36.

The carcass ply 36 extends between the beads 10 on both sides. The carcass ply 36 extends along and inward of the tread 4 and the sidewalls 6. The carcass ply 36 is formed from multiple cords aligned with each other, and a topping rubber, which is not shown. An absolute value of an angle of each cord relative to the equator plane ranges from 75 degrees to 90 degrees. In other words, the carcass 12 forms a radial structure. The cords are formed from an organic fiber. Preferable examples of the organic fiber include polyethylene terephthalate fibers, nylon fibers, rayon fibers, polyethylene naphthalate fibers, and aramid fibers.

The belt 14 is disposed inward of the tread 4 in the radial direction. The belt 14 is layered over the carcass 12. The belt 14 reinforces the carcass 12.

In the tire 2, cushion layers are provided near ends of the belt 14. As shown in the drawings, the ends of the belt 14 are layered over the carcass 12 through cushion layers 38. The cushion layers 38 are formed from a flexible crosslinked rubber. The cushion layers 38 absorb stress on the ends of the belt 14. The cushion layers 38 restrain lifting of the belt 14.

The belt 14 includes an inner layer 40a and an outer layer 40b. As is apparent from FIG. 1, a width, in the axial direction, of the inner layer 40a is slightly greater than a width, in the axial direction, of the outer layer 40b. In the tire 2, ends of the inner layer 40a correspond to the ends of the belt 14. The width, in the axial direction, of the belt 14 is preferably greater than or equal to 0.7 times the maximum width of the tire 2. The belt 14 may include three or more layers 40.

Each of the inner layer 40a and the outer layer 40b includes multiple cords aligned with each other, and a topping rubber, which is not shown. Each cord is tilted relative to the equator plane. An absolute value of the tilt angle is greater than or equal to 10 degrees, and not greater than 35 degrees in general. A direction in which each cord of the inner layer 40a is tilted relative to the equator plane is opposite to a direction in which each cord of the outer layer 40b is tilted relative to the equator plane. A preferable material of the cords is a steel. An organic fiber may be used for the cords.

In the tire 2, a first cover rubber 42a is provided near each end of the inner layer 40a. A second cover rubber 42b is provided near each end of the outer layer 40b. As is apparent from the drawings, each cover rubber 42 covers the end of each layer 40. The first cover rubber 42a holds the end of the inner layer 40a. The second cover rubber 42b holds the end of the outer layer 40b. Thus, an influence on durability in the end portions of the belt 14 is reduced.

The band 16 is disposed outward of the belt 14 in the radial direction. A width, in the axial direction, of the band 16 is almost equal to a width, in the axial direction, of the belt 14. The width, in the axial direction, of the band 16 may be slightly greater than the width, in the axial direction, of the belt 14. The width, in the axial direction, of the band 16 may be slightly less than the width, in the axial direction, of the belt 14. The band 16 is formed from a cord and a topping rubber, which is not shown. The cord is helically wound. The band 16 has a so-called jointless structure. The cord extends substantially in the circumferential direction. An angle of the cord relative to the circumferential direction is less than or equal to 5 degrees, and more preferably less than or equal to 2 degrees. The belt 14 is held by the cord, to restrain lifting of the belt 14. From the viewpoint that the belt 14 is effectively held, the width, in the axial direction, of the band 16 is preferably greater than or equal to 0.9 times the width, in the axial direction, of the belt 14, and preferably not greater than 1.1 times the width thereof. The cord is formed from an organic fiber. Preferable examples of the organic fiber include nylon fibers, polyethylene terephthalate fibers, rayon fibers, polyethylene naphthalate fibers, and aramid fibers.

The belt 14 and the band 16 form a reinforcing layer. The reinforcing layer may be formed by only the belt 14. The reinforcing layer may be formed by only the band 16.

The insert 18 is disposed inward of the carcass 12. More specifically, the insert 18 is disposed between the carcass 12 and the inner liner 20. In the tire 2, the insert 18 extends between the beads 10 on both sides. The insert 18 extends along and inward of the carcass 12. The insert 18 is formed from a crosslinked rubber.

As is apparent from the drawings, in the tire 2, the insert 18 is disposed outward of the inner part 34a of each bead 10 in the radial direction. The insert 18 is disposed inward of each sidewall 6 in the axial direction. The insert 18 extends almost outward of the inner part 34a in the radial direction. The insert 18 can reinforce regions of the sidewalls 6 of the tire 2. In the tire 2, in a case where an internal pressure is reduced due to puncture, the insert 18 can contribute to supporting the weight of the vehicle. Thus, also in a case where an internal pressure is low, the tire 2 enables running over a certain distance. The tire 2 is a run flat tire. The tire 2 is of a side-reinforcing type.

In the tire 2, from the viewpoint of reduction of a weight, the insert 18 may be provided only inward of each sidewall 6 in the axial direction, instead of the insert 18 being provided so as to extend between the beads 10 on both sides. In this case, the tire 2 has a pair of inserts 18 disposed inward of the sidewalls 6, respectively, in the axial direction.

The inner liner 20 is disposed inward of the carcass 12. The inner liner 20 forms an inner surface 44 of the tire 2. As described above, in the tire 2, the insert 18 extends, inward of the carcass 12, between the beads 10 on both sides. Therefore, in the tire 2, the inner liner 20 is joined to the inner surface of the insert 18. The inner liner 20 is formed from a crosslinked rubber. A rubber excellent in air tightness is used for the inner liner 20. A typical base rubber of the inner liner 20 is a butyl rubber or a halogenated butyl rubber. The inner liner 20 can contribute to maintaining an internal pressure of the tire 2. In the tire 2, the inner liner 20 may not necessarily be provided.

Therefore, from the viewpoint of reduction of production cost and weight, the inner liner 20 may not be used as a component of the tire 2.

The chafers 22 are disposed near the beads 10, respectively. When the tire 2 is mounted to a rim, the chafers 22 abut against the rim. Abutting of the chafers 22 against the rim protects portions near the beads 10. In the present embodiment, the chafers 22 are integrated with the clinches 8. Therefore, the same material is used for the chafers 22 and the clinches 8. The chafers 22 may be formed from a fabric and a rubber impregnated into the fabric.

Figure 2:
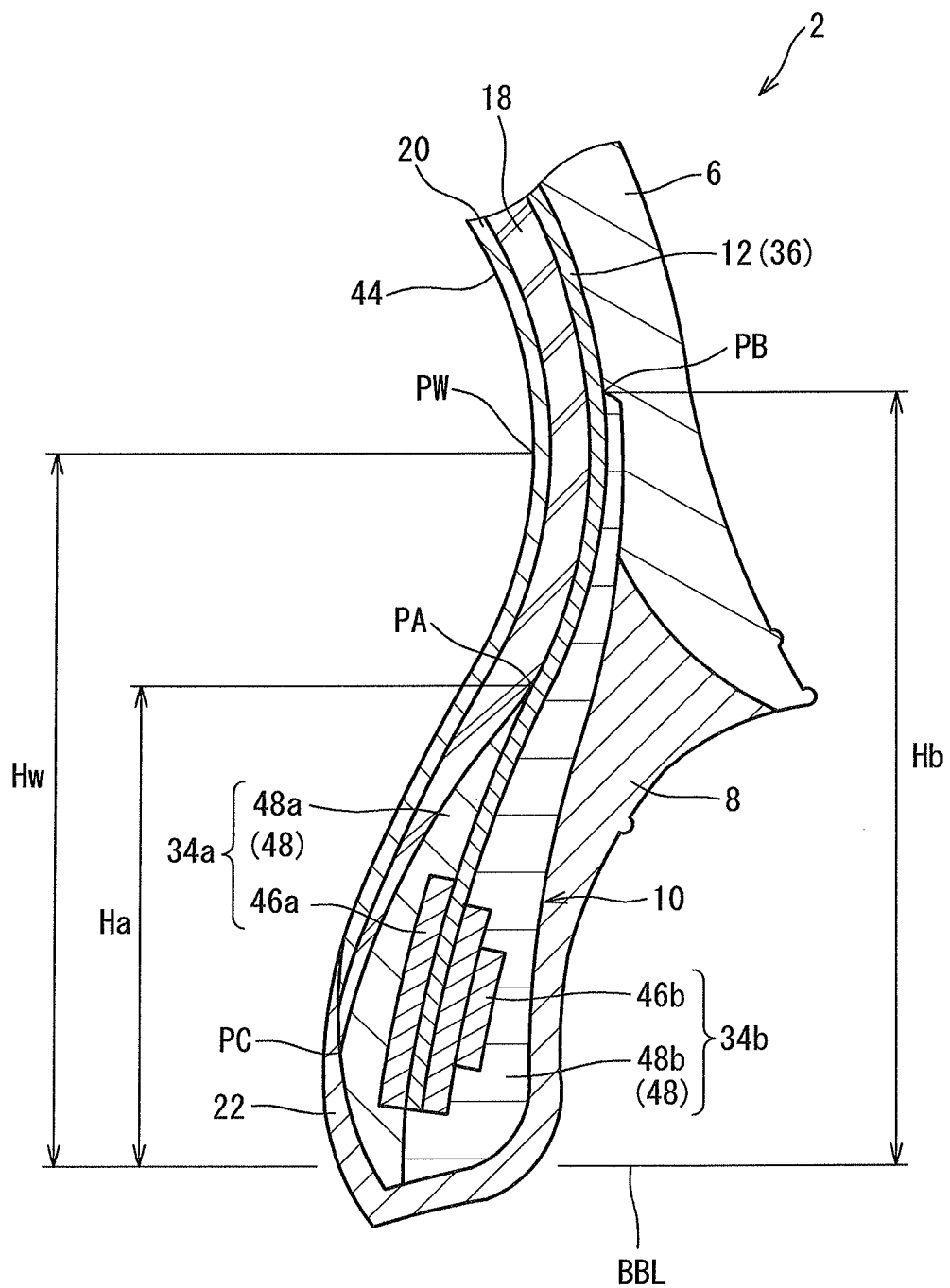
FIG. 2 is an enlarged cross-sectional view of a part of the tire shown in FIG. 1.

FIG. 2 shows a portion of the bead 10 of the tire 2 shown in FIG. 1. In FIG. 2, the upward/downward direction represents the radial direction of the tire 2, the leftward/rightward direction represents the axial direction of the tire 2, and the direction orthogonal to the surface of the sheet represents the circumferential direction of the tire 2. In FIG. 2, a solid line BBL represents a bead base line. The bead base line is a line that defines a diameter (see JATMA) of a rim (not shown) to which the tire 2 is mounted. Reference character PW represents a position at which the inner width of the tire 2 formed by the inner surface 44 is maximum in the axial direction. In other words, the inner width of the tire 2 formed by the inner surface 44 is maximum in the axial direction at the position represented by reference character PW.

As described above, in the tire 2, each bead 10 includes the inner part 34a. The inner part 34a includes an inner core 46a and an inner apex 48a. More specifically, the inner part 34a is formed by the inner core 46a and the inner apex 48a.

The inner core 46a is formed so as to be ring-shaped. The inner core 46a includes a non-stretchable wound wire, which is not shown. In the tire 2, the inner core 46a is formed by the wire being spirally wound along the circumferential direction. A typical material of the wire is a steel. As is apparent from the drawings, the inner core 46a is disposed inward of the carcass ply 36 in the axial direction. More specifically, the inner core 46a contacts with the inner surface of an end portion of the carcass ply 36.

The inner apex 48a is formed from a crosslinked rubber. The inner apex 48a is disposed inward of the carcass ply 36 in the axial direction. The inner apex 48a covers the inner core 46a, and extends almost outward of the inner core 46a in the radial direction. In the tire 2, an outer end PA of the inner apex 48a is located outward of an inner end PC of the insert 18 in the radial direction.

As described above, in the tire 2, each bead 10 further includes the outer part 34b. The outer part 34b includes an outer core 46b and an outer apex 48b. More specifically, the outer part 34b is formed by the outer core 46b and the outer apex 48b.

The outer core 46b is formed so as to be ring-shaped. The outer core 46b includes a non-stretchable wound wire, which is not shown. In the tire 2, the outer core 46b is formed by the wire being spirally wound along the circumferential direction. A typical material of the wire is a steel. In the tire 2, the wire of the outer core 46b is the same as the wire used for the inner core 46a described above. As is apparent from the drawings, the outer core 46b is disposed outward of the carcass ply 36 in the axial direction. More specifically, the outer core 46b contacts with the outer surface of the end portion of the carcass ply 36.

The outer apex 48b is formed from a crosslinked rubber. The outer apex 48b is disposed outward of the carcass ply 36 in the axial direction. The outer apex 48b covers the outer core 46b, and extends almost outward of the outer core 46b in the radial direction. In the tire 2, an outer end PB of the outer apex 48b is located outward of the position PW in the radial direction. The position of the outer end PB and the position PW may be the same in the radial direction. The outer end PB may be located inward of the position PW in the radial direction.

As is apparent from the drawings, in the tire 2, the end portion of the carcass ply 36 is sandwiched between the inner core 46a and the outer core 46b of each bead 10. In an inward portion of each bead 10 in the radial direction, the inner apex 48a and the outer apex 48b are joined to each other. In the tire 2, the carcass ply 36 is not turned back as in conventional tires. The carcass 12 of the tire 2 is easily formed. The carcass 12 can contribute to improvement of productivity.

In the tire 2, the crosslinked rubber used for the inner apex 48a is different from the crosslinked rubber used for the outer apex 48b. In the tire 2, the apex 48 of each bead 10 is formed from a plurality of crosslinked rubbers having different characteristics.

In the tire 2, the outer apex 48b forms an outer part of each bead 10 in the axial direction. The outer apex 48b is disposed between the carcass 12 and the clinch 8. As described above, the clinch 8 abuts against a flange of a rim. The outer apex 48b is disposed closer to the flange of the rim than the inner apex 48a. The outer apex 48b exerts an influence on responsiveness of the tire 2.

In the tire 2, a complex elastic modulus Eb of the outer apex 48b is higher than a complex elastic modulus Ea of the inner apex 48a. More specifically, a ratio of the complex elastic modulus Eb of the outer apex 48b to the complex elastic modulus Ea of the inner apex 48a is greater than 1. In the tire 2, the outer apex 48b is harder than the inner apex 48a. The hard outer apex 48b can contribute to responsiveness of the tire 2. The tire 2 is excellent in steering stability.

In the present invention, the complex elastic modulus Ea of the inner apex 48a, the complex elastic modulus Eb of the outer apex 48b, and a complex elastic modulus Ec of the insert 18 described below are measured according to the standards of "JIS K 6394" under the following conditions.

Viscoelasticity spectrometer: "VESF-3" manufactured by Iwamoto Seisakusho
Initial strain: 10%
Dynamic strain: ±1%
Frequency: 10 Hz
Deformation mode: tension
Measurement temperature: 70° C.

In the tire 2, the inner apex 48a forms an inner part of each bead 10 in the axial direction. In the tire 2, in a case where an internal pressure is reduced due to puncture, the outer apex 48b is compressed. On the other hand, the inner apex 48a is stretched.

In the tire 2, the complex elastic modulus Ea of the inner apex 48a is less than the complex elastic modulus Eb of the outer apex 48b. More specifically, a ratio (Ea/Eb) of the complex elastic modulus Ea of the inner apex 48a to the complex elastic modulus Eb of the outer apex 48b is less than or equal to 0.3. In the tire 2, the inner apex 48a is more flexible than the outer apex 48b. The flexible inner apex 48a can contribute to ride comfort exhibited by the tire 2. Further, in a case where an internal pressure of the tire 2 is reduced due to puncture, the flexible inner apex 48a is deformed so as to follow the deformation of the outer apex 48b. The tire 2 is excellent in durability (also referred to as run flat durability) in the case of an internal pressure being reduced due to puncture. According to the present invention, the tire 2 excellent in ride comfort and run flat durability can be obtained.

In the tire 2, the ratio (Ea/Eb) is preferably not less than 0.15. Thus, difference between the complex elastic modulus Ea of the inner apex 48a and the complex elastic modulus Eb of the outer apex 48b can be reduced. In the tire 2, run flat durability is prevented from being affected due to the inner apex 48a having an excessively low complex elastic modulus Ea, and ride comfort is prevented from being affected due to the outer apex 48b having an excessively high complex elastic modulus Eb. In these viewpoints, the ratio (Ea/Eb) is more preferably not less than 0.17.

In the tire 2, the inner apex 48a is disposed inward of the carcass 12 in the axial direction. The inner apex 48a is disposed inward of the insert 18 in the radial direction. In the tire 2, a ratio (Ea/Ec) of the complex elastic modulus Ea of the inner apex 48a to the complex elastic modulus Ec of the insert 18 is greater than or equal to 1. In other words, in the tire 2, the complex elastic modulus Ea of the inner apex 48a is equal to the complex elastic modulus Ec of the insert 18, or higher than the complex elastic modulus Ec of the insert 18. In the tire 2, the inner apex 48a is less flexible than the insert 18. The inner apex 48a can appropriately contribute to stiffness of the tire 2. The tire 2 is excellent in steering stability. Further, the tire 2 enables running over a certain distance even in the case of an internal pressure being low.

In the tire 2, the ratio (Ea/Ec) is preferably not greater than 2.5. Thus, a difference between the complex elastic modulus Ea of the inner apex 48a and the complex elastic modulus Ec of the insert 18 can be reduced. In the tire 2, ride comfort is prevented from being affected due to the inner apex 48a having an excessively high complex elastic modulus Ea, and steering stability is prevented from being affected due to the insert 18 having an excessively low complex elastic modulus Ec. Further, a difference in stiffness between the inner apex 48a and the insert 18 can be appropriately maintained, and concentration of stress on a boundary face between the inner apex 48a and the insert 18 is thus reduced. The tire 2 is excellent in run flat durability. In this viewpoint, the ratio (Ea/Ec) is more preferably not greater than 2.0.

In the tire 2, the complex elastic modulus Ea of the inner apex 48a is preferably higher than or equal to 9 MPa, and preferably not higher than 24 MPa. When the complex elastic modulus Ea is set so as to be higher than or equal to 9 MPa, the inner apex 48a can appropriately contribute to stiffness of the tire 2. The tire 2 is excellent in steering stability. In this viewpoint, the complex elastic modulus Ea is more preferably higher than or equal to 12 MPa. When the complex elastic modulus Ea is set so as to be not higher than 24 MPa, affect of the inner apex 48a upon stiffness of the tire 2 is reduced. In the tire 2, run flat durability can be improved without deteriorating ride comfort. In this viewpoint, the complex elastic modulus Ea is more preferably not higher than 20 MPa.

In the tire 2, the complex elastic modulus Eb of the outer apex 48b is preferably higher than or equal to 40 MPa, and preferably not higher than 80 MPa. When the complex elastic modulus Eb is set so as to be higher than or equal to 40 MPa, the outer apex 48b can appropriately contribute to stiffness of the tire 2. The tire 2 is excellent in steering stability. In this viewpoint, the complex elastic modulus Eb is more preferably higher than or equal to 50 MPa. When the complex elastic modulus Eb is set so as to be not higher than 80 MPa, affect of the outer apex 48b upon stiffness of the tire 2 is reduced. The tire 2 is excellent in ride comfort. In this viewpoint, the complex elastic modulus Eb is more preferably not higher than 70 MPa.

In the tire 2, the complex elastic modulus Ec of the insert 18 is preferably higher than or equal to 8 MPa, and preferably not higher than 13 MPa. When the complex elastic modulus Ec is set so as to be higher than or equal to 8 MPa, the insert 18 can effectively contribute to stiffness of regions of the sidewalls 6 of the tire 2. In a case where an internal pressure of the tire 2 is reduced due to puncture, the insert 18 can support the weight of the vehicle. Thus, the tire 2 enables running over a certain distance even in the case of an internal pressure being low. In this viewpoint, the complex elastic modulus Ec is more preferably higher than or equal to 10 MPa. When the complex elastic modulus Ec is set so as to be not higher than 13 MPa, affect of the insert 18 upon stiffness of the tire 2 is reduced. The tire 2 is excellent in ride comfort. In this viewpoint, the complex elastic modulus Ec is more preferably not higher than 12 MPa.

In FIG. 2, a double-headed arrow Hw represents a height, in the radial direction, from the bead base line to the position PW. A double-headed arrow Ha represents a height, in the radial direction, from the bead base line to the outer end PA of the inner apex 48a. A double-headed arrow Hb represents a height, in the radial direction, from the bead base line to the outer end PB of the outer apex 48b.

In the tire 2, a ratio (Ha/Hw) of the height Ha to the height Hw is preferably greater than or equal to 0.3, and preferably not greater than 1.5. When the ratio (Ha/Hw) is set so as to be greater than or equal to 0.3, the inner apex 48a can appropriately contribute to stiffness of the tire 2. The tire 2 is excellent in steering stability. When the ratio (Ha/Hw) is set so as to be not greater than 1.5, affect of the inner apex 48a upon stiffness of the tire 2 is reduced. In the tire 2, run flat durability can be improved without deteriorating ride comfort.

In the tire 2, a ratio (Hb/Hw) of the height Hb to the height Hw is preferably greater than or equal to 0.6, and preferably not greater than 1.5. When the ratio (Hb/Hw) is set so as to be greater than or equal to 0.6, the outer apex 48b can appropriately contribute to stiffness of the tire 2. The tire 2 is excellent in steering stability. When the ratio (Hb/Hw) is set so as to be not greater than 1.5, affect of the outer apex 48b upon stiffness of the tire 2 is reduced. The tire 2 is excellent in ride comfort.

Preferably, in the tire 2, a position of the outer end PA of the inner apex 48a is the same as a position of the outer end PB of the outer apex 48b in the radial direction, or the outer end PA of the inner apex 48a is located inward of the outer end PB of the outer apex 48b in the radial direction. In other words, a ratio (Ha/Hb) of the height Ha to the height Hb is preferably less than or equal to 1.0. Thus, the outer apex 48b can effectively contribute to stiffness of the tire 2. The tire 2 is excellent in steering stability. In the tire 2, the ratio (Ha/Hb) is preferably not less than 0.5. Thus, the inner apex 48a can effectively contribute to stiffness of the tire 2. The tire 2 is excellent in steering stability and run flat durability.

In the present invention, the dimensions and angles of the components of the tire 2 are measured in a state where the tire 2 is mounted to a normal rim, and the tire 2 is inflated to a normal internal pressure. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure. In the case of the tire 2 for use in passenger cars, the dimensions and angles are measured in a state where the internal pressure is 180 kPa.

The tire 2 described above is manufactured in the following method. In this manufacturing method, a core is prepared. The core has a toroidal outer surface, which is not shown. The outer surface forms a shape approximate to a shape formed by the inner surface 44 of the tire 2 that is inflated with air so as to maintain an internal pressure at 5% of the normal internal pressure.

In this manufacturing method, the inner liner 20 is wound on the outer surface of the core. The insert 18 is adhered to the inner liner 20. The inner apexes 48a are adhered to both end portions, respectively, of the insert 18. The inner cores 46a are combined with the inner apexes 48a, respectively. The carcass ply 36 is adhered so as to cover a region from the inner core 46a on one side to the inner core 46a on the other side. The outer cores 46b are combined with both end portions, respectively, of the carcass ply 36. The outer apexes 48b are adhered so as to cover the outer cores 46b, respectively. The belt 14, the band 16, the sidewalls 6, the tread 4, and the like are further combined, to obtain a raw cover (a tire in a non-crosslinked state). In this manufacturing method, a process of assembling the components into the raw cover is also referred to as a forming process.

In this manufacturing method, multiple components including the inner liner 20 are combined on the outer surface of the core, to obtain the raw cover. In this manufacturing method, the components are assembled into the raw cover on the outer surface of the core. As described above, the outer surface of the core forms a shape approximate to a shape formed by the inner surface 44 of the tire 2 that is inflated with air so as to maintain an internal pressure at 5% of the normal internal pressure. In this manufacturing method, shaping of the raw cover as performed in the conventional manufacturing methods need not be performed. In this manufacturing method, the raw cover is not stretched in the forming process.

In this manufacturing method, the raw cover is put into an opened mold. In this manufacturing method, the raw cover combined with the core is put into the mold. Therefore, the core is located inside the raw cover having been put into the mold.

In this manufacturing method, when the mold is closed, the raw cover is sandwiched between a cavity surface of the mold and the outer surface of the core, and pressurized, which is not shown. The raw cover is heated due to heat transfer from the core and the mold. By the raw cover being pressurized and heated, a rubber composition of the raw cover flows. Crosslinking reaction occurs in the rubber composition due to the heating, to obtain the tire 2 shown in FIG. 1. The tire 2 is formed by the raw cover being pressurized and heated in a cavity formed between the mold and the core. In this manufacturing method, a process of pressurizing and heating the raw cover is also referred to as a crosslinking process.

As described above, in this manufacturing method, the raw cover combined with the core is put into the mold, and the raw cover is sandwiched between the cavity surface of the mold and the outer surface of the core, and is pressurized and heated. In this manufacturing method, bladders as used in the conventional manufacturing methods are unnecessary. In this manufacturing method, the raw cover is not stretched in the crosslinking process.

As described above, in this manufacturing method, the raw cover is not stretched in the forming process. Further, in the crosslinking process, the raw cover is not stretched. In this manufacturing method, change of a shape of the raw cover can be substantially restrained as compared to in the conventional manufacturing methods. In this manufacturing method, a specific portion is less likely to be formed in the shapes of the components such as the tread 4, the sidewalls 6, and the like. This manufacturing method can contribute to manufacturing the tire 2 that includes the components having almost uniform shapes in the circumferential direction.

EXAMPLES

Hereinafter, effects of the present invention will become apparent according to examples. However, the present invention should not be restrictively construed based on the description of examples.

Example 1

A pneumatic tire (size: 215/45R17) of Example 1 having the fundamental structure shown in FIG. 1 and having specifications indicated below in table 1, was obtained. In Example 1, a complex elastic modulus Ea of an inner apex of each bead was 12 MPa. A height Ha, in the radial direction, from the bead base line to an outer end PA of the inner apex, was 30 mm. A complex elastic modulus Eb of an outer apex of each bead was 70 MPa. A height Hb, in the radial direction, from the bead base line to an outer end PB of the outer apex, was 40 mm. A complex elastic modulus Ec of an insert was 12 MPa. A height Hw, in the radial direction, from the bead base line to a position PW at which the inner width of the tire formed by an inner surface was maximum in the axial direction, was 43 mm.

In Example 1, a ratio (Ea/Eb) of the complex elastic modulus Ea to the complex elastic modulus Eb was 0.17. A ratio (Ea/Ec) of the complex elastic modulus Ea to the complex elastic modulus Ec was 1.00. A ratio (Hb/Hw) of the height Hb to the height Hw was 0.93. A ratio (Ha/Hb) of the height Ha to the height Hb was 0.75.

Examples 2 to 3 and Comparative Examples 1 to 2

Tires of Examples 2 to 3 and Comparative Examples 1 to 2 were each obtained in the same manner as in Example 1 except that a complex elastic modulus Ea was as indicated below in table 1, and a ratio (Ea/Eb) and a ratio (Ea/Ec) were different.

Examples 4 to 5 and Comparative Example 3

Tires of Examples 4 to 5 and Comparative Example 3 were each obtained in the same manner as in Example 1 except that a complex elastic modulus Eb was as indicated below in table 2, and a ratio (Ea/Eb) was different.

Examples 6 to 7 and Comparative Example 4

Tires of Examples 6 to 7 and Comparative Example 4 were each obtained in the same manner as in Example 1 except that a complex elastic modulus Ea and a complex elastic modulus Eb were as indicated below in table 2, and a ratio (Ea/Eb) and a ratio (Ea/Ec) were different.

Example 8 and Comparative Example 5

Tires of Example 8 and Comparative Example 5 were each obtained in the same manner as in Example 1 except that a complex elastic modulus Ec was as indicated below in table 3, and a ratio (Ea/Ec) was different.

Examples 9 to 10

Tires of Examples 9 to 10 were each obtained in the same manner as in Example 1 except that a complex elastic modulus Ea and a complex elastic modulus Ec were as indicated below in table 3, and a ratio (Ea/Eb) and a ratio (Ea/Ec) were different.

Comparative Examples 6 to 7

Tires of Comparative Examples 6 to 7 were each obtained in the same manner as in Example 1 except that a complex elastic modulus Ea and a complex elastic modulus Eb were as indicated below in table 3, and a ratio (Ea/Eb) and a ratio (Ea/Ec) were different.

Examples 11 to 14

Tires of Examples 11 to 14 were each obtained in the same manner as in Example 1 except that a height Hb was as indicated below in table 4, and a ratio (Hb/Hw) and a ratio (Ha/Hb) were different.

Examples 15 to 16

Tires of Examples 15 to 16 were each obtained in the same manner as in Example 1 except that a height Ha and a height Hb were as indicated below in table 4, and a ratio (Hb/Hw) and a ratio (Ha/Hb) were different.

[Steering Stability and Ride Comfort]

Each tire was mounted to a 17×7.0 J rim, and was inflated with air to an internal pressure of 240 kPa. The tires with the rims were mounted to a front-engine, rear-wheel-drive layout passenger car having an engine displacement of 2.0 liters. A driver was caused to drive the passenger car on a racing circuit, and evaluate steering stability and ride comfort. The results are indicated below in Tables 1 to 4, as indexes, with 10 being the best score. The greater the value of the index is, the better the evaluation is.

Run Flat Durability

Each tire was mounted to a rim (size: 17×7.0 J) in a state where a valve core was removed. A vertical load of 3.48 kN was applied to each tire. Each tire in a deflated state was set on a drum having a radius of 1.7 m, and running on the drum was performed at 36° C. to 40° C., at a speed of 80 km/h. A running distance obtained when the tire was broken was measured. The results are indicated below in Tables 1 to 4, as indexes, based on a value in Comparative Example 6 being 100. The greater the value of the index is, the better the evaluation is.

TABLE 1

| | Evaluation results | | | | |
|---|---|---|---|---|---|
| | Comp. Ex. 1 | Ex. 1 | Ex. 2 | Ex. 3 | Comp. Ex. 2 |
| Inner apex | | | | | |
| Modulus Ea [MPa] | 8 | 12 | 17 | 20 | 25 |
| Height Ha [mm] | 30 | 30 | 30 | 30 | 30 |
| Outer apex | | | | | |
| Modulus Eb [MPa] | 70 | 70 | 70 | 70 | 70 |
| Height Hb [mm] | 40 | 40 | 40 | 40 | 40 |
| Insert | | | | | |
| Modulus Ec [MPa] | 12 | 12 | 12 | 12 | 12 |
| Ratio (Ea/Eb) | 0.11 | 0.17 | 0.24 | 0.29 | 0.36 |
| Ratio (Ea/Ec) | 0.67 | 1.00 | 1.42 | 1.67 | 2.08 |
| Ratio (Hb/Hw) | 0.93 | 0.93 | 0.93 | 0.93 | 0.93 |
| Ratio (Ha/Hb) | 0.75 | 0.75 | 0.75 | 0.75 | 0.75 |
| Steering stability | 6.00 | 6.50 | 6.50 | 6.75 | 6.50 |
| Ride comfort | 6.00 | 6.50 | 6.50 | 6.25 | 5.50 |
| Durability | 95 | 110 | 105 | 105 | 100 |

TABLE 2

| | Evaluation results | | | | | |
|---|---|---|---|---|---|---|
| | Ex. 4 | Ex. 5 | Comp. Ex. 3 | Ex. 6 | Ex. 7 | Comp. Ex. 4 |
| Inner apex | | | | | | |
| Modulus Ea [MPa] | 12 | 12 | 12 | 15 | 20 | 20 |
| Height Ha [mm] | 30 | 30 | 30 | 30 | 30 | 30 |
| Outer apex | | | | | | |
| Modulus Eb [MPa] | 80 | 50 | 30 | 50 | 67 | 50 |
| Height Hb [mm] | 40 | 40 | 40 | 40 | 40 | 40 |
| Insert | | | | | | |
| Modulus Ec [MPa] | 12 | 12 | 12 | 12 | 12 | 12 |
| Ratio (Ea/Eb) | 0.15 | 0.24 | 0.40 | 0.30 | 0.30 | 0.40 |
| Ratio (Ea/Ec) | 1.00 | 1.00 | 1.00 | 1.25 | 1.67 | 1.67 |
| Ratio (Hb/Hw) | 0.93 | 0.93 | 0.93 | 0.93 | 0.93 | 0.93 |
| Ratio (Ha/Hb) | 0.75 | 0.75 | 0.75 | 0.75 | 0.75 | 0.75 |
| Steering stability | 6.50 | 6.25 | 5.50 | 6.25 | 6.50 | 6.00 |
| Ride comfort | 6.25 | 6.75 | 6.25 | 6.50 | 6.25 | 5.75 |
| Durability | 110 | 115 | 90 | 115 | 110 | 90 |

TABLE 3

| | Evaluation results | | | | | |
|---|---|---|---|---|---|---|
| | Comp. Ex. 5 | Ex. 8 | Ex. 9 | Ex. 10 | Comp. Ex. 6 | Comp. Ex. 7 |
| Inner apex | | | | | | |
| Modulus Ea [MPa] | 12 | 12 | 20 | 20 | 50 | 70 |
| Height Ha [mm] | 30 | 30 | 30 | 30 | 30 | 30 |
| Outer apex | | | | | | |
| Modulus Eb [MPa] | 70 | 70 | 70 | 70 | 50 | 70 |
| Height Hb [mm] | 40 | 40 | 40 | 40 | 40 | 40 |
| Insert | | | | | | |
| Modulus Ec [MPa] | 14 | 10 | 10 | 8 | 12 | 12 |
| Ratio (Ea/Eb) | 0.17 | 0.17 | 0.29 | 0.29 | 1.00 | 1.00 |
| Ratio (Ea/Ec) | 0.86 | 1.20 | 2.00 | 2.50 | 4.17 | 5.83 |
| Ratio (Hb/Hw) | 0.93 | 0.93 | 0.93 | 0.93 | 0.93 | 0.93 |
| Ratio (Ha/Hb) | 0.75 | 0.75 | 0.75 | 0.75 | 0.75 | 0.75 |
| Steering stability | 6.00 | 6.50 | 6.50 | 6.25 | 6.00 | 6.50 |
| Ride comfort | 5.50 | 6.50 | 6.25 | 6.25 | 6.00 | 5.00 |
| Durability | 90 | 110 | 105 | 105 | 100 | 90 |

TABLE 4

| | Evaluation results | | | | | |
|---|---|---|---|---|---|---|
| | Ex. 11 | Ex. 12 | Ex. 13 | Ex. 14 | Ex. 15 | Ex. 16 |
| Inner apex | | | | | | |
| Modulus Ea [MPa] | 12 | 12 | 12 | 12 | 12 | 12 |
| Height Ha [mm] | 30 | 30 | 30 | 30 | 25 | 35 |

TABLE 4-continued

| | Evaluation results | | | | | |
|---|---|---|---|---|---|---|
| | Ex. 11 | Ex. 12 | Ex. 13 | Ex. 14 | Ex. 15 | Ex. 16 |
| Outer apex | | | | | | |
| Modulus Eb [MPa] | 70 | 70 | 70 | 70 | 70 | 70 |
| Height Hb [mm] | 25 | 30 | 60 | 65 | 60 | 30 |
| Insert | | | | | | |
| Modulus Ec [MPa] | 12 | 12 | 12 | 12 | 12 | 12 |
| Ratio (Ea/Eb) | 0.17 | 0.17 | 0.17 | 0.17 | 0.17 | 0.17 |
| Ratio (Ea/Ec) | 1.00 | 1.00 | 1.00 | 1.00 | 1.00 | 1.00 |
| Ratio (Hb/Hw) | 0.58 | 0.70 | 1.40 | 1.51 | 1.40 | 0.70 |
| Ratio (Ha/Hb) | 1.20 | 1.00 | 0.50 | 0.46 | 0.42 | 1.17 |
| Steering stability | 6.25 | 6.25 | 6.50 | 6.50 | 6.50 | 6.25 |
| Ride comfort | 6.25 | 6.50 | 6.50 | 6.50 | 6.50 | 6.25 |
| Durability | 100 | 100 | 120 | 110 | 110 | 100 |

As indicated in Tables 1 to 4, the evaluation result is better in the tires of Examples than in the tires of Comparative Examples. The evaluation results clearly indicate that the present invention is superior.

The tire described above is applicable to various vehicles. The foregoing description is in all aspects illustrative, and various modifications can be devised without departing from the essential features of the invention.

What is claimed is:

1. A pneumatic tire comprising:
   a pair of beads;
   a carcass extending between one of the beads and the other of the beads; and
   an insert disposed inward of the carcass, wherein
   each of the beads includes an inner part disposed inward of the carcass in an axial direction, and an outer part disposed outward of the carcass in the axial direction,
   the carcass includes a carcass ply,
   the inner part includes an inner core that contacts with an inner surface of an end portion of the carcass ply, and an inner apex that covers the inner core and extends outward of the inner core in a radial direction,
   the outer part includes an outer core that contacts with an outer surface of the end portion of the carcass ply, and an outer apex that covers the outer core and extends outward of the outer core in the radial direction,
   the insert is disposed outward of the inner apex in the radial direction,
   a ratio of a complex elastic modulus Ea of the inner apex to a complex elastic modulus Eb of the outer apex is less than or equal to 0.3, and
   a ratio of the complex elastic modulus Ea of the inner apex to a complex elastic modulus Ec of the insert is greater than or equal to 1.

2. The pneumatic tire according to claim 1, wherein the complex elastic modulus Ea of the inner apex is higher than or equal to 9 MPa, and not higher than 24 MPa.

3. The pneumatic tire according to claim 1, wherein
   when a position at which an inner width of the tire formed by an inner surface of the tire is maximum in the axial direction, is represented as PW,
   a ratio of a height Hb, in the radial direction, from a bead base line to an outer end of the outer apex with respect to a height Hw, in the radial direction, from the bead base line to the position PW is greater than or equal to 0.6, and not greater than 1.5.

4. The pneumatic tire according to claim 1, wherein a position of an outer end of the inner apex is the same as a position of an outer end of the outer apex in the radial direction, or the outer end of the inner apex is located inward of the outer end of the outer apex in the radial direction.

5. The pneumatic tire according to claim 1, wherein the inner apex covers the entire axial inner surface of the inner core, and wherein the outer apex covers the entire axial outer surface of the outer core.

6. The pneumatic tire according to claim 1, wherein, in an inward portion of each bead in the radial direction, the inner apex and the outer apex are joined to each other.

\* \* \* \* \*